March 18, 1952 G. T. RANDOL Re. 23,473
SHIFT-LEVER CONTROLLED AUTOMOTIVE CLUTCH
Original Filed Aug. 11, 1943 5 Sheets-Sheet 1
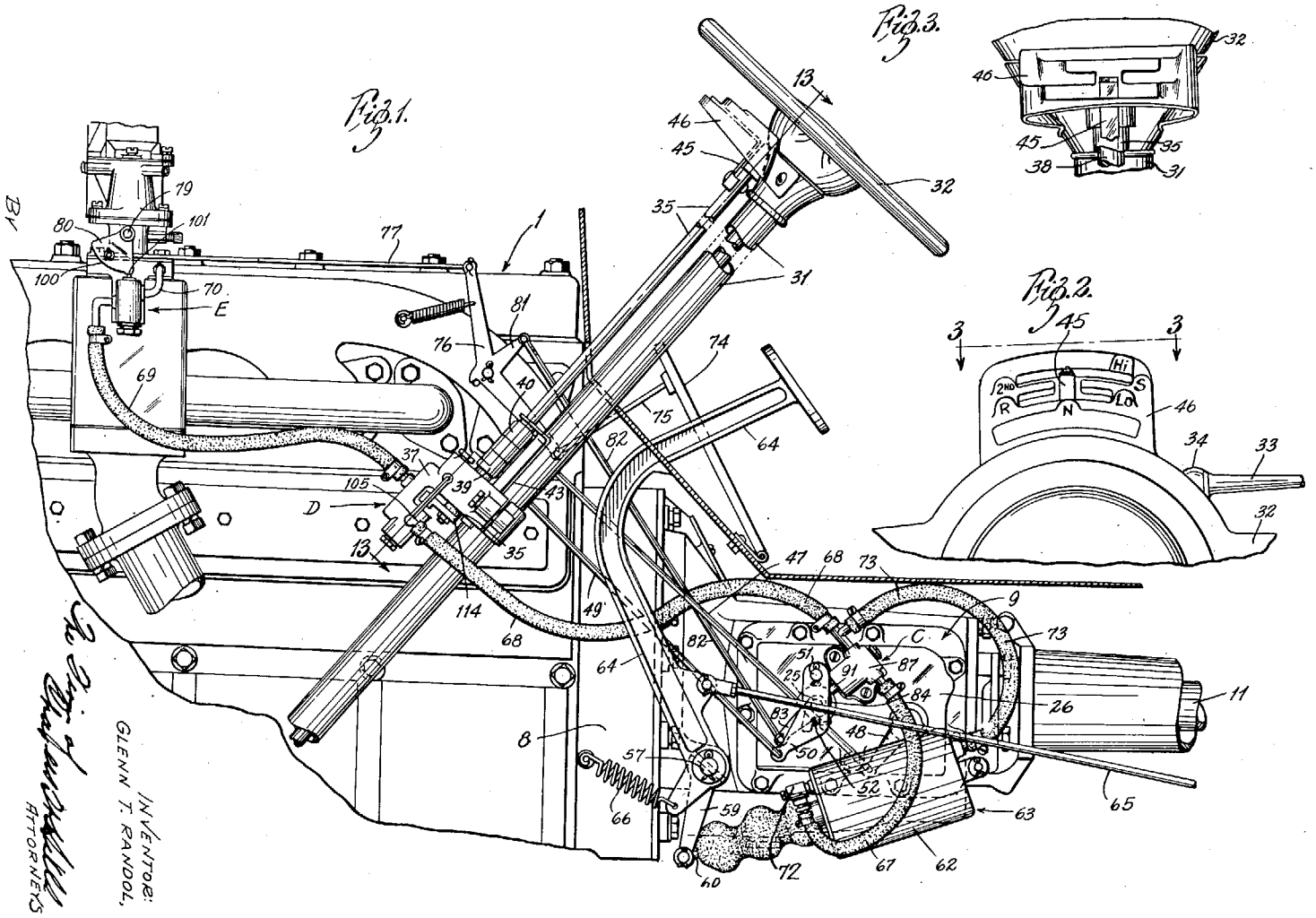

March 18, 1952 G. T. RANDOL Re. 23,473
SHIFT-LEVER CONTROLLED AUTOMOTIVE CLUTCH
Original Filed Aug. 11, 1943 5 Sheets-Sheet 2
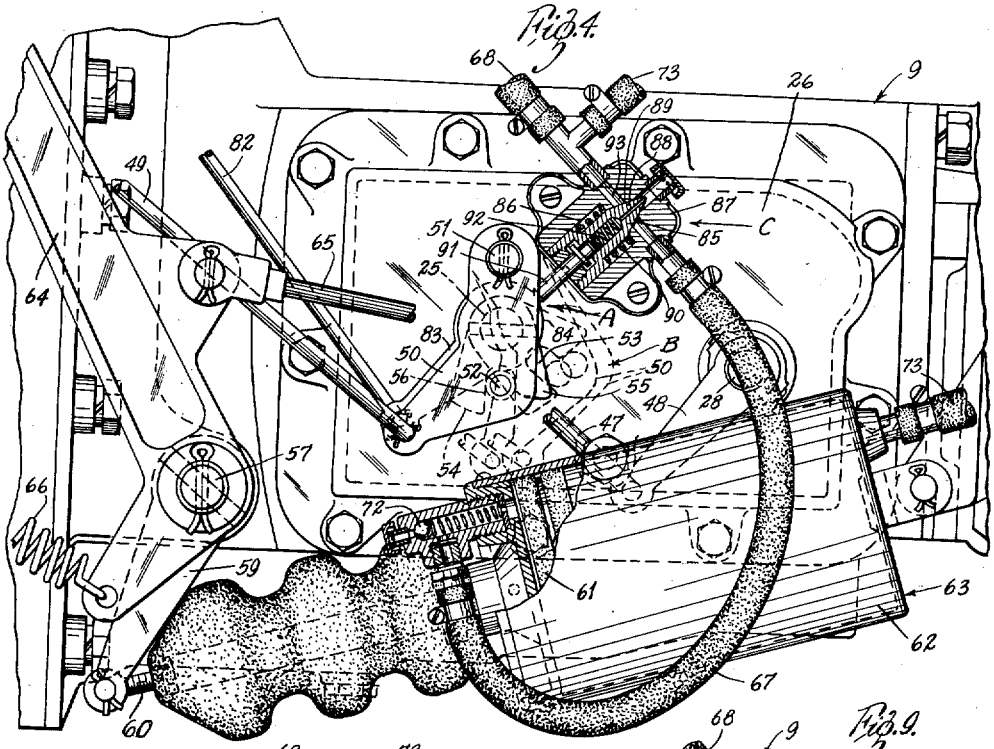
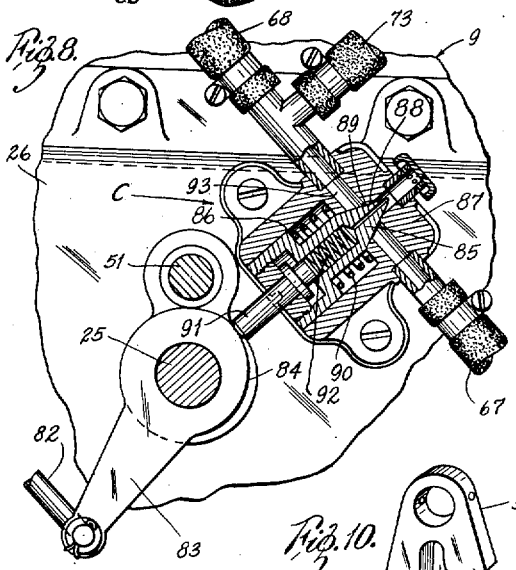
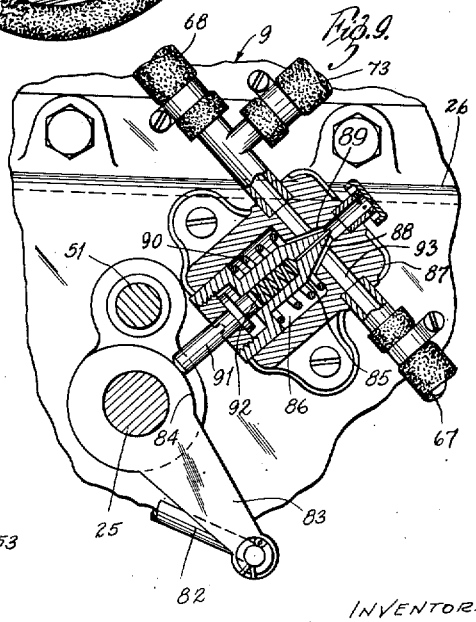
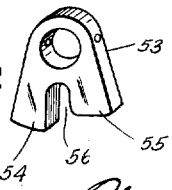
INVENTOR:
GLENN T. RANDOL,
The firm of Charles H. Hill
BY ATTORNEYS March 18, 1952 G. T. RANDOL Re. 23,473
SHIFT-LEVER CONTROLLED AUTOMOTIVE CLUTCH
Original Filed Aug. 11, 1943 5 Sheets-Sheet 3
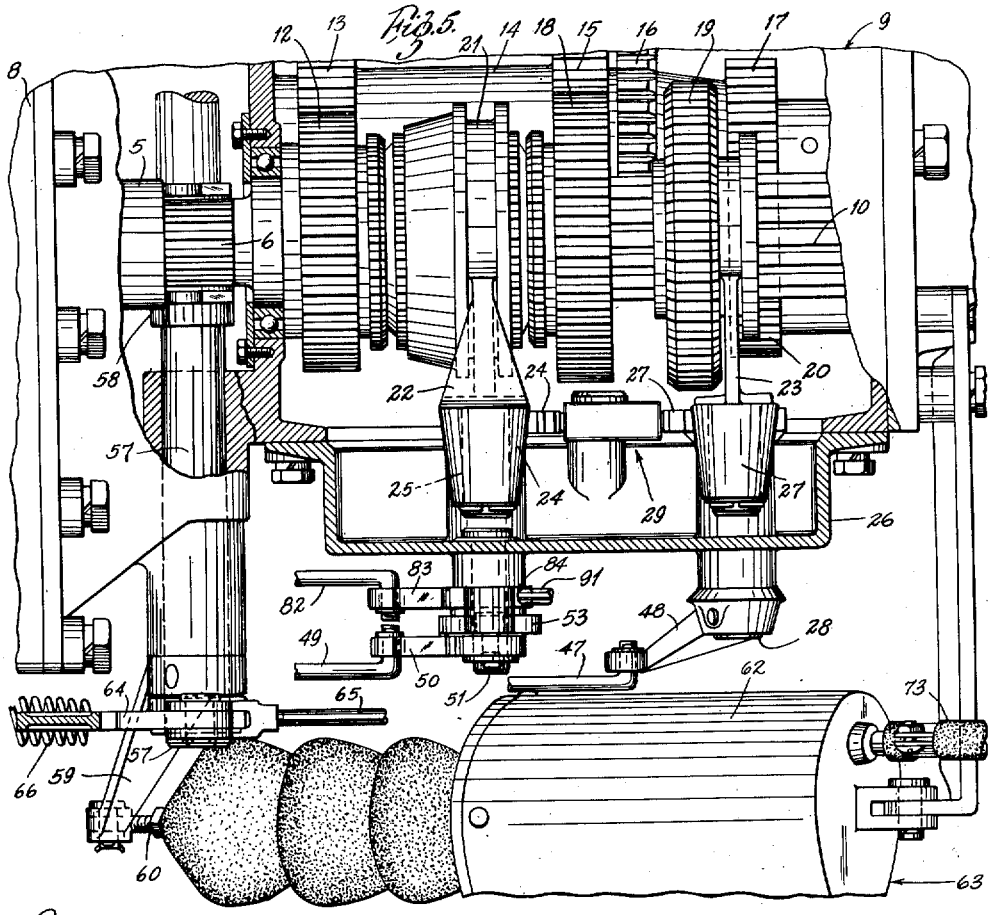
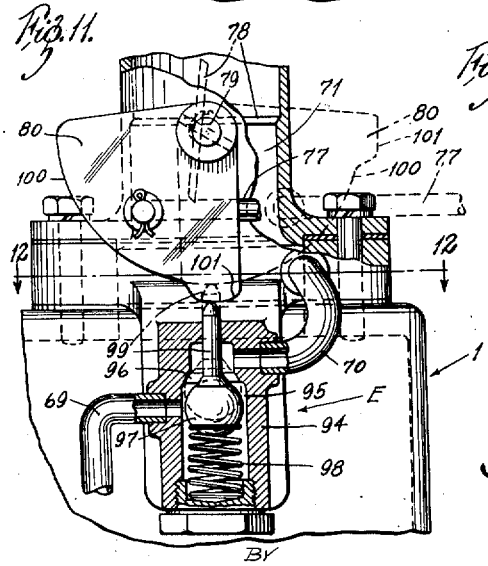
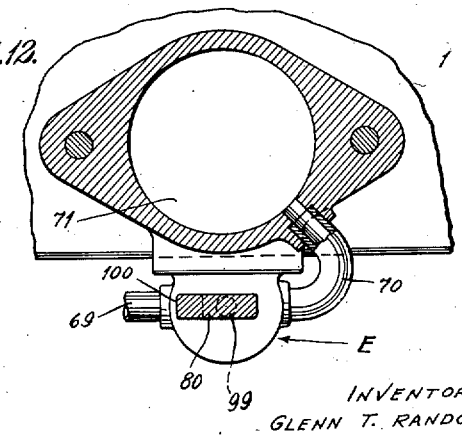
INVENTOR:
GLENN T. RANDOL,
BY
ATTORNEYS

SHIFT-LEVER CONTROLLED AUTOMOTIVE CLUTCH

Original Filed Aug. 11, 1943 5 Sheets-Sheet 4

INVENTOR:
GLENN T. RANDOL,

BY The Firm of Charles A. Hill ATTORNEYS

SHIFT-LEVER CONTROLLED AUTOMOTIVE CLUTCH
Original Filed Aug. 11, 1943 5 Sheets-Sheet 5
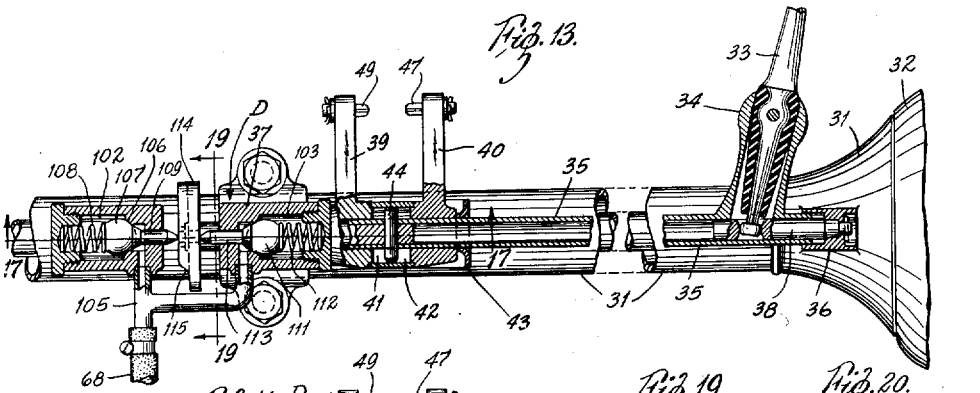
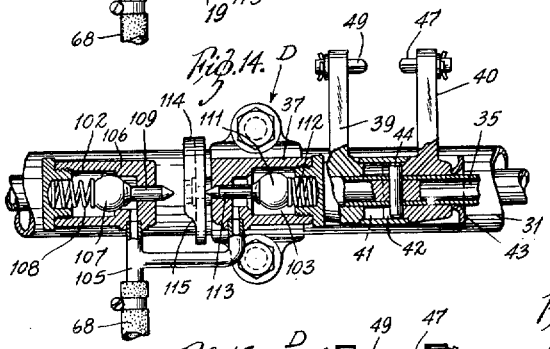
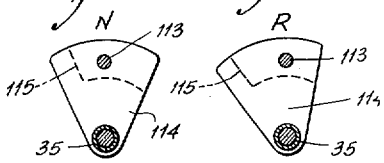
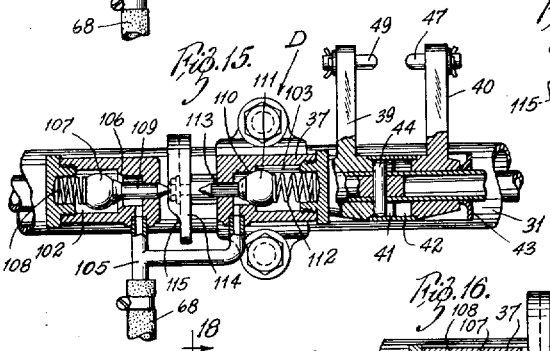
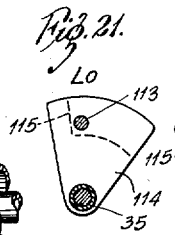
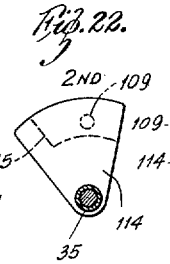
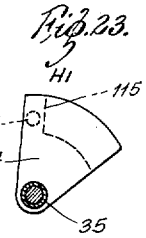
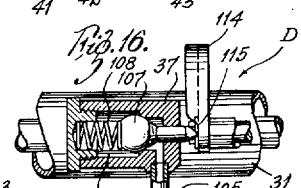
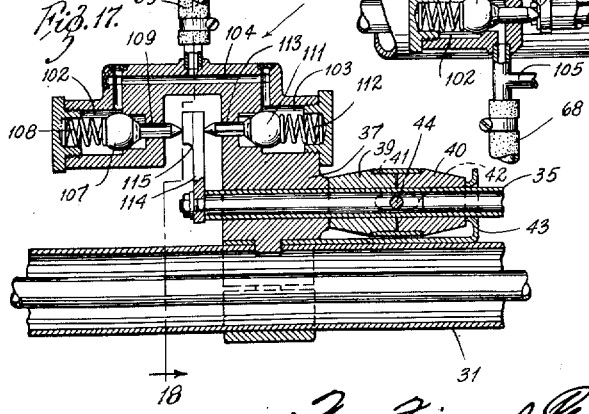
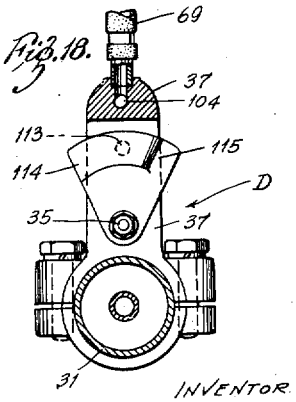
INVENTOR
GLENN T. RANDOL,
BY The Firm of Charles H. Hild ATTORNEYS Reissued Mar. 18, 1952

Re. 23,473

UNITED STATES PATENT OFFICE 23,473

SHIFT-LEVER CONTROLLED AUTOMOTIVE CLUTCH

Glenn T. Randol, Mountain Lake Park, Md.

Original No. 2,479,083, dated August 16, 1949, Serial No. 498,153, August 11, 1943. Application for reissue March 28, 1950, Serial No. 154,381

29 Claims. (Cl. 192—.052)

Matter enclosed in heavy brackets [ ] appears in the original patent but forms no part of this reissue specification; matter printed in italics indicates the additions made by reissue.

My invention relates to motor vehicles and more particularly to the control of the [main] *power-transmitting* friction clutch thereof situated between the source of power and the change-speed gearing.

One of the objects of my invention is to provide improved power-operated means for controlling the disengagement and re-engagement of a motor vehicle clutch to thereby facilitate the operation of the vehicle by the operator.

*An additional object of my invention is to provide power-operated means for actuating a motor vehicle clutch by manual manipulation of a dual purpose actuator while preventing clutch actuation under certain operating conditions.*

Another object of my invention is to provide *novel* means for controlling the *power*-disengagement of a *motor* vehicle clutch by the same means employed in controlling the change-speed gearing of the vehicle.

Another object of my invention *related to that last stated* is to provide means for controlling a vehicle clutch by the gear shifting mechanism and *engine* accelerator mechanism.

Yet another object of my invention is to so control [a vehicle] *an automotive friction* clutch by an operation of the gear shifting lever that the clutch can be *power*-disengaged before a gear ratio is made active and automatically re-engaged thereafter.

Still another object of my invention is to so control a *motor* vehicle clutch that it can be disengaged by gear controlling means prior to a gear ratio being made active *thereby* and then subsequently re-engaged by operation of the vehicle engine controlling mechanism.

A further object of my invention is to provide improved control means for a power-operated vehicle clutch which will *enable* [permit] the vehicle operator to properly control the disengagement and re-engagement of the clutch during gear shifting by [employing] *operating* only the gear-shift lever and the accelerator mechanism.

*Yet an additional object of my invention is to provide means for controlling a motor vehicle clutch by disengagement and controlled re-engagement of the clutch in response to vehicle operation to selectively establish a plurality of modulatory gear ratios, the means being disabled under certain operating conditions to preserve active a desired ratio.*

Another object of my invention is to provide in a clutch disengaging and re-engaging control means of the kind referred to, a disabling means controlled by a predetermined or supplemental movement of the gear shifting lever after a gear ratio has been established.

A more specific object of my invention is to provide a power-*operated* means for disengaging a clutch and a control means for the power means which can be operated by the shifting lever of the change-speed gearing when actuated in its neutral range of movement.

*Another more specific object of my invention is to provide means for establishing a plurality of gearing conditions in a change-speed gearing as determined by a manual selector, power means responsive to movement of a control member for actuating a clutch, and means responsive to the selector whereby the power means can be disabled to prevent clutch actuation despite movement of the control member.*

Other objects of my invention will become apparent from the following description taken in connection with the accompanying drawings in which:

Figure 1 is a side view of a portion of a motor vehicle showing my improved clutch control mechanism associated therewith, the clutch being engaged, the accelerator mechanism in released *engine idling* position, and the gear shifting mechanism in neutral condition;

Figure 2 is a top view of the gear shifting lever as associated with the steering column;

Figure 3 is a view taken as indicated by the line 3—3 of Figure 2;

Figure 4 is an enlarged side view of the structure mounted on the exterior of the change-speed gearing casing showing the manner in which it is associated with the gear shifting mechanism and the clutch, parts being shown in section;

Figure 5 is a top view of the mechanism shown in Figure 4 with a portion of the change-speed gearing casing broken away to show the gearing;

Figure 8 is an enlarged sectional view of the accelerator-controlled valve associated with the clutch operating power cylinder, said valve being in a position corresponding to the released position of the accelerator mechanism;

Figure 9 is a view similar to Figure 8 but showing the parts in positions corresponding to a depressed position of the accelerator mechanism;

Figure 10 is a view of the arm mounted on the exterior end of the control shaft for the second and high speed shifting fork;

Figure 11 is an enlarged view, with parts shown in section, of the valve associated with the carburetor and also controlled by the accelerator mechanism;

Figure 12 is a sectional view taken on the line 12—12 of Figure 11;

Figure 13 is a sectional view taken on the line 13—13 of Figure 1 showing details of the valve means and structure mounted on the steering column;

Figure 14 is another sectional view of the valve means shown in Figure 13, the valve elements thereof being in positions corresponding to the raised position of the gear shifting shaft on the steering column;

Figure 15 is a view similar to Figure 14 but showing the valve elements in positions corresponding to the lowered position of the gear shifting *control* shaft;

Figure 16 is a partial sectional view showing the closed position one of the valve elements assumes when the gear shifting lever is moved to a supplemental position beyond that necessary to cause high speed [ratio] to be active;

Figure 17 is a sectional view taken on the line 17—17 of Figure 13;

Figure 18 is a sectional view taken on the line 18—18 of Figure 17;

Figure 19 is a view taken on the line 19—19 of Figure 13 showing the neutral position of the valve controlling plate;

Figure 24:
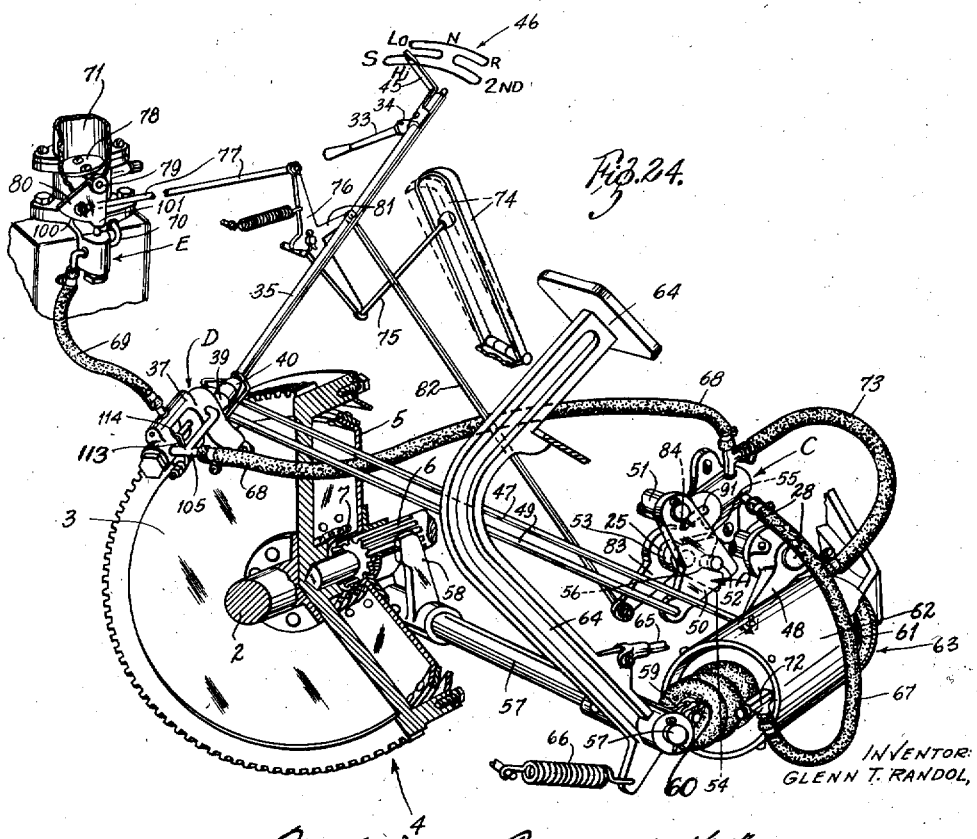

Figures 20, 21, 22 and 23 are views similar to Figure 19 but showing the valve controlling plate and actuated valve element stems in the positions corresponding to reverse, low, second and high *speed* gear ratios, respectively; and Figure 24 is a schematic view of the principal parts of the clutch control mechanism showing the manner in which they are associated with the accelerator mechanism when released, the clutch when disengaged, and the change-speed gearing and its shifting mechanism when in high speed [ratio] positions, prior to movement of the gear shifting lever to its supplemental position to prevent power-*operated de*clutch*ing* operations after the clutch has once been engaged.

Referring to the drawings in detail and first to Figures 1, 5, 6 and 24, my clutch control mechanism is shown associated with an internal-combustion engine, the accelerator control mechanism thereof, the change-speed gearing, and the interposed [main] friction clutch, all part of well-known automobile construction. The internal-combustion engine 1 has its crank-shaft 2 (Figure 24) connected to one element 3 of the [main] friction clutch 4. The cooperating clutch element 5 is splined on the gearing drive shaft 6 for sliding movement, whereby it may be engaged and disengaged from the clutch element 3. A spring 7 normally biases the clutch element 5 [to] *into* engaged position. The [main] clutch 4 is enclosed within housing 8 secured to the engine and attached to this housing is the change-speed gearing casing 9. The forward end of the casing has the driving shaft 6 of the *gearing* [gear] journaled therein. Aligned with the gearing driving shaft is a driven shaft 10 for driving the propeller shaft 11 leading to the [rear] wheels of the vehicle.

The change-speed gearing within casing 9 is of well-known construction and comprises a gear 12 fixed to the inner end of [drive] *the driving* shaft 6 and constantly meshing with a gear 13 for driving countershaft 14 upon which is secured a second speed gear 15, a low speed gear 16, and a reverse gear 17. The driven shaft 10 has rotatably mounted thereon a second speed gear 18 constantly meshing with gear 15. To the rear of gear 18 is a slidable low and reverse gear 19 splined to the driven shaft and capable of selective engagement with the low speed gear 16 or the reverse idler gear 20 which is in constant mesh with reverse gear 17. A double clutch member 21 is splined on the driven shaft between the driving shaft gear 12 and the second speed gear 13 and when moved forwardly is *effective* [adapted] to directly connect the driving shaft 6 and the driven shaft 10 for direct or high speed [ratio] drive and when moved rearwardly is adapted to connect the second speed gear 18 to the driven shaft to [permit] *transmit* power [to be transmitted] through gears 12, 13, 15 and 18 for second speed [ratio] drive.

Figure 6:
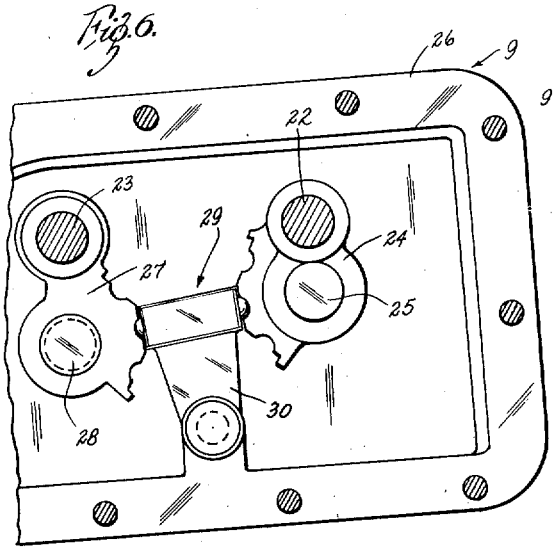
Figure 6 is a view of the inside of the gear casing cover plate showing shifting arms and the interlock associated therewith.

The double clutch member 21 is controlled by a shifting fork 22 and the combined low and reverse gear 19 is controlled by a shifting fork 23. As best shown in Figure 6, shifting fork 22 is pivotally mounted on an arm 24 secured to a shaft 25 journaled in the cover plate 26 of the gear casing. The shifting fork 23 is similarly pivotally connected to an arm 27 secured to a shaft 28 also journaled in the cover plate of the gear casing. Cooperating with arms 24 and 27 is a combined detent and interlocking mechanism generally indicated by the reference numeral 29. This mechanism is carried on an arm 30 pivotally connected to the inside of the cover plate. The combined detent and interlocking mechanism is of well-known construction and operation and need not be described in detail as it is not a part of the structure embodying [the] *my* invention. Its purpose is simply to yieldably hold the gear shifting forks in their neutral and *gear* operative positions and to prevent the movement of one arm and shifting fork from a neutral position when the other arm and shifting fork is in an operative position causing a gear ratio to be active. Any other suitable detent and interlocking mechanism can be employed if desired.

The change-speed gearing is adapted to be manually shifted by means of a single manually-controlled selecting lever *or gearing actuator* which is preferably mounted on the steering column 31 just beneath the steering wheel 32. As best shown in Figures 1, 2, 3 and 13 to 17, the gear shifting lever 33 is pivotally mounted on an extension 34 integrally carried on the upper end of a tubular shaft 35. The shaft is adapted to have both rotative and reciprocable movement and its upper end is journaled to a suitable bracket 36 on the steering column and its lower end is journaled in a valve housing member 37 clamped to the lower portion of the steering column. The inner end of lever 33 *is universally fulcrumed* [universally fulcrums] in a socket of a rod 38 secured to the bracket 36 and extending into the upper end of shaft 35. Thus by this arrangement it is seen that lever 33 can reciprocate *control* shaft 35 when the outer end of the lever is moved upwardly or downwardly and can rotate *said* shaft 35 when the lever is swung in the plane of the steering wheel.

The lower end of shaft 35 has rotatably mounted thereon two arms 39 and 40, their adjacent hub parts being provided with slots 41 and 42. The arms are held from longitudinal movement by being interposed between the valve housing 37 and a bracket 43 secured to the steering column by the same securing means employed for mounting the housing. Shaft 35 is provided with a pin 44 for cooperation with slots 41 and 42. When shaft 35 is moved downwardly, pin 44 will engage slot 41 and connect arm 39 to the shaft. When shaft 35 is moved upwardly, pin 44 will engage slot 42 and connect arm 40 to the shaft. Pin 44 has a neutral position corresponding to neutral condition of the gearing wherein it is partially engaged with each of the slots. In order to prevent the rotation of the shaft and the simultaneous operation of both arms and to also indicate to the driver the condition of the gear shifting lever and the corresponding condition of the change-speed gearing which it controls, the upper end of the shaft has mounted thereon a pointer 45 which cooperates with a modified H-slot in a bracket 46 secured to the steering column. This pointer is arranged to be positioned in the cross-over part of the H-slot when pin 44 is in its neutral position as shown in Figure 13. As shown in Figure 2, the three ends of the H-slot, which are of the same length, are marked with indicia to indicate the condition of the change-speed gearing, said indicia being "R" for reverse, "Lo" for low speed [ratio], "2nd" for second speed [ratio]; while the fourth slot, which is longer than the other three, has two positions, namely, "Hi" for high speed [ratio] or direct drive, and "S" at the end of the slot to indicate the position of the pointer wherein the control of the power operation of the clutch will be disabled following the engagement of said clutch after a shift has been made to high speed [ratio]. The "N" indicia is placed opposite the cross-over portion of the slots to indicate the neutral condition of the gearing.

The arm 40 is adapted to be connected to control the low and high speeds [ratios] of the gearing and in order to accomplish this the outer end of this arm is connected by a rod 47 to an arm 48 secured to the outer end of the previously mentioned shaft 28 which is connected to shifting fork 23 controlling the combined low and reverse gear 19. Arm 39 is adapted to control the second and high speed gear ratio of the transmission and in order to accomplish this a rod 49 connects its outer end with the free end of an arm 50 which is pivotally mounted by a pin 51 to the gear casing cover, this pin being positioned above the previously referred to shaft 25 which controls the shifting fork 22 for the double clutch member 21. Arm 50 carries a pin 52 which is adapted to cooperate with an arm 53 secured to the outer end of shaft 25. This arm 53 is provided with a long leg 54 and a short leg 55 between which is a slot 56 for receiving pin 52 *to provide an escapement connection between the gear shifting lever 33 and the double clutch member 21.*

The purpose of the pin and slot *escapement* connection between arm 50 and arm 53 is to *accommodate* [permit] additional free movement of arm 50 without any movement of arm 53 and the shifting fork 22. When the double clutch member 21 is in its inoperative position, pin 52 will be in slot 56 and the relationship between arms 50 and 53 *which are operatively connected to the lever 33 and member 21 respectively,* will be as shown in Figure 4. When the gear shifting lever 33 is operated in such a manner as to place the gearing in second speed [ratio], arm 50 will have a clockwise movement, as viewed in Figure 4, and will assume the position shown in Figure 7. By means of the pin and slot connection, arm 53 will be moved with arm 50 and the clutch member 21 moved rearwardly so as to connect the second speed gear 18 to the driven shaft. When gear shift *actuator* [lever] 33 is moved to a position to cause high speed [ratio] to be operated, arm 50 will be moved in a counterclockwise direction from the position shown in Figure 4 and to the *first* dotted line position indicated by the letter A. During this movement, pin 52 will cooperate with slot 56 and cause simultaneous movement of arm 50 and arm 53 to bring about the engagement of the clutch member 21 with the driving shaft to cause high speed [ratio] or direct drive to be operative. In making this engagement, shift lever 33 need only be moved to the "Hi" position which is part of its throw as *provided* [permitted] by the extra long slot in which the pointer moves. When the lever is given its supplemental movement so that the pointer is at the end of the slot at the position "S," pin 52 will ride out of slot 56 because of the shortness of arm 55 and slide over the end of this short arm to the *second* dotted position B (Figure 4). Thus there is *provided* [permitted] an additional or supplemental movement of the gear shifting lever and linkage without movement of the *positive* clutch member 21. The purpose of this will become apparent later.

When either low or reverse speed [ratio] is desired, the gear shifting lever 33 is merely moved so as to place the pointer in either the "R" or "Lo" end of the H-slot. This will result in arm 40 being turned by shaft 35 on the steering column and by means of rod 47, shaft 28 is so turned that the combined low and reverse gear will be properly moved to operative position.

Referring again to Figures 1, 4, 5 and 24, the [main] friction clutch *4* is shown as being controlled by a clutch shaft 57 journaled in the clutch housing at right angles to and below the axis of the clutch. The inner end of this shaft carries a fork 58 which is adapted to engage the clutch element 5 for moving it to a disengaged position, as shown in Figure 24. The outer end of shaft 57 has secured thereto a downwardly extending arm 59 which is connected, by means of a rod 60, to a piston 61 reciprocable in a cylinder 62, said piston and cylinder forming a fluid *pressure* motor 63. When the piston is in the forward end of the cylinder, as shown in Figure 4, the clutch will be in engaged condition. When the piston is moved to the rear end of the cylinder, shaft 57 will be rotated and the clutch disengaged. As shown in the drawings, the outer end of the clutch shaft is also employed to loosely journal a brake pedal 64 thereon; said pedal having a rod 65 for connection with the vehicle brake assemblies. A spring 66 biases the brake pedal to its inoperative position. No clutch pedal is employed as [one] *such* is not needed for reasons which will *hereinafter* become apparent.

Reference is now made to Figures 1, 4, 5, 7, 8, 9 and 11 to 24 for a showing of the structure employed for controlling the fluid *pressure* motor *63*. The forward end of the cylinder of the fluid motor is connected, by means of a conduit 67, to a control valve generally indicated by the letter C. To this control valve is also connected a conduit 68 which leads to a control valve means, generally indicated by the letter D, embodied in the previously mentioned *valve* casing 37 secured to the lower end of the steering column. This latter valve means is connected, by a conduit 69, to a third control valve E mounted on the engine adjacent the carburetor for the engine. A conduit 70 leads from this latter valve to the *car-*

*buretor* intake passage 71 of the engine which is employed as the source of *fluid pressure* [power]. Interposed between the rear end of cylinder 62 and conduit 67 is a *one-way air flow* check valve 72 [to permit air to flow] *for accommodating air flow* from the atmosphere into the forward end of the cylinder but preventing *the forcing of air from* [it from being forced out of] the cylinder to the atmosphere except by way of conduit 67. The rear end of the cylinder of the fluid motor is connected, by means of a conduit 73, to conduit 68 which leads to the engine intake by way of valve means D, conduit 69, and valve E.

The control valve C is adapted to be controlled by the accelerator mechanism for the engine. The accelerator mechanism comprises the usual foot-operated treadle *or actuator* 74 which is connected by a rod 75, a bellcrank lever 76 and a rod 77 to the butterfly valve 78 (Figure 11) in the engine intake passage 71. The butterfly valve is mounted on a shaft 79 and the outer end of this shaft has secured thereto a plate 80 to which rod 77 is connected. Bellcrank lever 76, forming the connection between the treadle and the butterfly valve, is provided with an additional arm 81 which is connected by means of a rod 82 to the free end of an arm 83 loosely pivoted on the previously mentioned shaft 25 which controls the gear shifting fork 22 of the bearing. Arm 83 is positioned between arm 50 and the gear casing cover as best shown in Figure 5.

The hub of the arm *83* is formed to provide a cam surface 84 for controlling the movable valve element 85 of the control valve C. This valve element is slidable in a bore 86 of the valve housing 87 and is formed with a cone-shaped end 88 for cooperation with a cone-shaped passage 89 in the valve casing, said passage leading from the inner end of bore 86 to the atmosphere. A spring 88 tends to bias the valve element to a position *wherein* [where] it is disengaged from the cone-shaped passage. The valve element *85* is adapted to be seated by a rotation of arm 83, and the structure to bring this about is a stem 91 mounted in the valve element and cooperating with the cam surface 84. Between this stem and the valve element is a spring 92 to provide a yieldable connection. The cone-shaped passage 89 is intersected by a passage 93 which extends through the valve casing 85, one end of this passage 93 being connected to conduit 67 leading from the rear end of the fluid *pressure* motor and the other end being connected to conduit 68 leading to the engine intake manifold.

When the valve element 85 is seated in the cone-shaped passage, communication between conduits 67 and 68 will be cut off as will also any communication between the atmosphere and the conduits 67 and 68. When the valve element is unseated, both conduits 67 and 68 will be in communication with the atmosphere through the conical passage 89. When the accelerator mechanism is in its fully released condition, valve element 85 will be seated, as shown in Figure 8. When the accelerator mechanism is depressed, valve element 85 will be *opened* [permitted to become open] by the action of spring 86. The cam surface 84 is so arranged that the greater the extent of depressing of the accelerator treadle, the greater the opening of the valve element.

The accelerator mechanism also controls the control valve E adjacent the carburetor. This valve E, as shown in Figure 11, comprises a casing 94 having a passage 95 therethrough with which a valve seat 96 is associated. The passage on one side of the valve seat is connected to conduit 69 and on the other side of the valve seat to conduit 70 which leads to the intake passage 71 to the engine. Cooperating with the valve seat is a ball valve element 97 biased toward closed position by a spring 98. This valve element carries a stem 99 which extends through casing 94 to a position beneath plate 80 which is secured to the butterfly valve shaft. The plate has a circular edge surface 100 and a raised cam surface 101. When the accelerator mechanism is in its fully released position, the raised cam surface will cooperate with stem 99 and cause the valve element to be unseated so that the passage 70 and 69 will be connected and air can be pulled through said passages into the intake passage of the engine. When the accelerator mechanism is depressed, plate 80 will be turned so that stem 90 can cooperate with surface 100 and under these conditions the valve element will be closed by spring 98, thus cutting off communication from passage 69 to the engine intake passage.

The control valve means D at the lower end of the steering column is shown in detail in Figures 13 to 17. The housing 37 of the valve means which is carried on the steering column is provided with two chambers 102 and 103, both in constant communication with conduit 69 by means of drilled passages 104 (see Figure 17). Both chambers are also adapted to be connected to conduit 68 coming from the control valve C, the connection being made by a Y-shaped connector 105. Chamber 102 has associated therewith a valve seat 106 and cooperating with this valve seat is a valve element 107 biased toward closed position by a spring 108. The valve element has a stem 109 which extends out of the chamber toward the other chamber 103. In a similar manner chamber 103 is provided with a valve seat 110 having cooperating therewith a valve element 111 acted on by a spring 112. Valve element 111 has a stem 113 which extends out of chamber 103 toward chamber 102. The ends of valve stems 109 and 113 are spaced apart when both valve elements are closed.

Positioned between the ends of the stems is a valve controlling plate 114 which is secured to the lower end of shaft 35 controlled by the gear shift lever 33. This plate 114 is arranged to unseat valve element 107 when shaft 35 is moved downwardly from its neutral position and to unseat valve element 111 when moved upwardly from its neutral position. When the *shaft 35 is biased by springs 108—112 into* [rod is in] its neutral position (Figure 13), both valves will be closed. The controlling plate is so arranged that the valve element 111 may be maintained open during the rotation of the shaft 35 in either direction when in its upper position corresponding to low and reverse gear ratios. When the shaft is in its lower position and the plate is cooperating with the stem of the valve element 107, the plate will hold the valve element open when the shaft is rotated to cause second speed [ratio] to be operative and will also hold the valve element open when the shaft is rotated to cause the high speed [ratio] to be operative. The open condition of the valve element *107* will be maintained for high speed [ratio], however, only during the movement of the gear shifting lever 33 to the position "Hi" *wherein* [where] the high speed [ratio] is [established] *operative*. When the gear shifting lever moves the additional or supplemental movement to the position "S" as [permitted] *ac-*

*commodated* by the extra length of the *bracket* slot *and the pin and slot escapement connection 52—56 (see Figures 4 and 7)*, as already described, the valve element 107 will be [permitted to be] automatically closed *by spring 108*. This is accomplished by relieving a portion of the surface of the controlling plate, as indicated by the numeral 115. Figures 19 to 23 show the valve controlling plate and its operative relation with the controlled valve stems when the change-speed gearing is in its neutral and [speed] *gear* ratio *operative* conditions.

*Operation*

When the change-speed gearing is in its neutral condition, the gear shifting lever 33 will be in the position shown in Figures 1, 2, 3 and 13. Under such conditions both valve element 107 and 111 of the valve means D will be *biased* closed *by springs 108 and 112 respectively*, and the rear end of the fluid motor *63* will be cut off from the engine intake manifold regardless of the condition of the control valves C and E. If the accelerator mechanism is in its released position, as shown in Figure 1, the control valve E will be opened and the control valve C will be closed. Since the conduit coming from the rear end of the cylinder 62 does not pass through the control valve C, this control valve *is effective to* [will have nothing to do with the] prevent[ion of] air being removed from the cylinder. If the accelerator should be depressed while the gearing is in neutral condition, valve E will become closed and valve C will become open. The power cylinder, however, will not be operated in any way since the two valve elements of the control valve D continue to be seated.

If it should now be desired to shift the gearing to either reverse or low, the outer end of the gear shift lever [38] *33* is raised and the pointer 45 placed in the plane of the "R" and "Lo" legs of the H-slot. The raising of shaft 35 also causes pin 44 to engage in slot 42 of arm 40 and plate 114 to engage and move valve element 111 to open position. The opening of this valve will *cause* [permit] the rear end of the power cylinder *62* to communicate with the manifold, provided, of course, that the accelerator mechanism is in its fully released position opening valve E, which condition is present when a shift is to be made. The fluid motor will now be operated and the piston thereof moved from the forward end of the cylinder to the rear end. During the movement of the piston, air can *also* freely enter *therethrough to* the forward end of the cylinder through check valve 72 regardless of the closed condition of the control valve C. The [main] friction clutch *4* will be disengaged to disconnect the engine from the gearing. If the gear shift lever should be moved to place the pointer in the "R" end of the H-slot, reverse speed [ratio] will be obtained by movement of the combined low and reverse gear 19 into engagement with the idler gear 20. If the lever is moved to cause the pointer to be in the "Lo" end of the H-slot, gear 19 will be meshed with gear 16 and low speed [ratio] will be effective. Regardless of which speed [ratio] is obtained, the [main] clutch *4* will remain in disengaged condition, provided, of course, that the accelerator mechanism has not been operated. To start the automobile, all that need be done now is to depress the accelerator treadle. This will speed up the engine by opening the butterfly valve of the carburetor and *simultaneously close* [will permit closing of] the control valve E. The rear end of the power cylinder *62* will now be cut-off from the intake of the engine. As the accelerator is depressed, the cam surface 84 on arm 83 will be so turned as to *cause* [permit the opening of] the control valve C *to open* and the air in the forward end of the cylinder 62 will be "bled off" to atmosphere through passage 89 and air can enter the rear end of the cylinder. The check valve 72 insures that all air which is being exhausted from the forward end of cylinder 62 will pass through control valve C. If the accelerator is *only* slightly depressed, the movement of piston 61 toward the forward end of the cylinder will be slow and thus there will be a *correspondingly* slow engagement of the clutch. If the accelerator treadle is depressed rapidly, the valve element 85 will be opened greater and there will be a more rapid engagement of the clutch due to the quicker exhausting of air from the forward end of the cylinder and the *increasing flow of air into* [permitting of more air to] the rear end of the cylinder.

Figure 7:
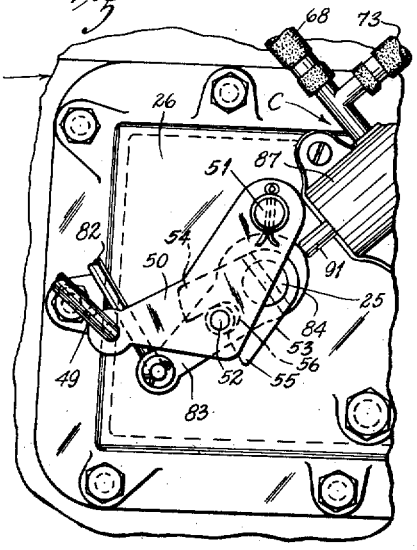
Figure 7 is a view showing certain parts associated with the control valve when the gearing is in second speed [ratio] and the accelerator mechanism is in released position.

If it is assumed that the gearing has been placed in low speed [ratio] and the automobile started under these conditions by depressing the accelerator treadle and it is desired to obtain second speed [ratio], the accelerator mechanism will be first released. This will result in the control valve E being opened and the control valve C being closed. Since valve element 111 of the control valve means D is still open due to the low speed [ratio] still being operative, the rear end of the fluid motor *63* will be connected to the intake of the engine and consequently the fluid motor *63* will be operated and the clutch *4* disengaged. The gear [shift lever] *actuator 33* may now be moved to disengage the combined low and reverse speed gear and connect the second speed gear 15 to the driven shaft. This will be accomplished when the gear shift lever is so moved that the pointer will be moved from the "Lo" end of the H-slot to the "2nd end of the H-slot. During the movement of the lever through the cross-over part of the H-slot, arm 40 will be disconnected from shaft 35 and arm 39 connected thereto so as to control the double clutch member 21 of the transmission to obtain the second speed [ratio]. When the control shaft 35 is moved downwardly as a result of the shifting of the gear shift lever, valve element 111 will become seated and valve element 107 will be unseated. This will have no effect in [permitting] *controlling* the clutch [to become re-engaged] *into re-engagement*, notwithstanding that the rear end of the fluid motor may be normally disconnected from the source of suction. This will be apparent when it is realized that the air in the forward end of the cylinder is trapped and the subatmospheric pressure is retained in the rear end of the cylinder due to the closed condition of the control valve C. With valve element 107 now unseated and the gearing conditioned for second speed [ratio], the clutch *4* may be re-engaged and the vehicle driven through this gear ratio by merely depressing the accelerator treadle. This will result in the valve E becoming closed and then the bleeding off of air from the forward end of the cylinder of the fluid motor and the *entry* [allowing] of air *into* [to enter] the [forward] *rear* end of the cylinder. The rapidity with which the clutch is [permitted to re-engage] *controlled into re-engagement* will depend upon the manner in which the accelerator treadle is depressed. Figure 7 shows the parts on the gear casing in second speed [ratio] prior to re-engagement of the clutch.

If it is now desired to place the transmission in high speed [ratio], [lever] *actuator* 33 is swung in a single plane so that the pointer moves from the "2nd" end of the H-slot to the "Hi" position of the H-slot after a release of the accelerator treadle. Releasing of the treadle will result in the clutch being disengaged since the control valve E will be opened to connect the rear end of the cylinder of the fluid motor to the intake passage of the engine. The moving of the gear shift lever will cause the double clutch member 21 to be moved *through the pin and slot connection 52—56*, so as to disconnect gear 15 from the driven shaft and directly connect said driven shaft to the driving shaft. The positions of the parts will be as shown in Figure 24 wherein the clutch is disengaged and high speed [ratio] established and pointer 45 is opposite the position "Hi." Since the pin and slot connection between arms 50 and 53 [permits] *accommodates* additional or supplemental (*escapement*) movement of the gear shift lever so that the pointer can reach the "S" position at the end of the H-slot, this additional or supplemental movement if made will result in the valve controlling plate 114 assuming the position shown in Figure 16 wherein the relieved portion 115 of the plate is opposite the stem of the valve element 107. This will *accommodate* [permit] closing of the valve element 107 *automatically by spring 108* and the immediate disconnection of the rear end of the cylinder of the fluid motor from the engine intake passage. However, the clutch 4 will not be engaged due to the trapped air in the forward end of the cylinder of the fluid motor. When the accelerator treadle is depressed, the control valve C will be opened and the clutch will then be re-engaged in the manner already described. However, the clutch will not again be disengaged when the accelerator treadle is released due to the closed condition of the valve element 107. Consequently when driving in high speed [ratio], the clutch will remain engaged regardless of the condition of the accelerator mechanism. This is very desirable since [one does not desire] operation of the clutch *should not occur* when driving in high speed [ratio] each time that the accelerator mechanism is released. Clutch disengagement is only desirable when a speed [ratio] is to be changed *or the vehicle stopped.*

With the gearing in high speed [ratio], if it is desired to neutralize the gearing, the accelerator mechanism is released so as to open the control valve E. When the gear shift lever is now moved toward neutral position, valve element 107 will be opened before the clutch member 21 is operated since the control plate 114 will be moved before arm [58] *50* picks up arm 53 by the pin *52* re-entering slot 56. Consequently, when the gear shift lever is moved *from "S" position* [back] to its neutral position, the [main] clutch *4* will be disengaged automatically and then the double clutch member 21 of the gearing moved to its neutral position.

From the foregoing *description* it is seen that my clutch controlling mechanism does not require any clutch pedal as the clutch will be disengaged and re-engaged *automatically* solely by the manipulation of the gear shift lever *33* and the accelerator pedal, said manipulation being the same as that normally employed during gear changing with a *pedally* [manually]-operated clutch. The arrangement is also such that once in high speed [ratio] with the gear shift lever given a supplemental movement, there will not be any *subsequent* disengagements of the clutch when the accelerator is moved to released position during driving.

In connection with applicant's invention involving the control of the engaging and disengaging of the clutch by the gear shift lever and the accelerator pedal, it is to be noted that such has many advantages in simplifying the operation of a motor vehicle. The control of the clutch by the necessity of operating a clutch pedal is completely eliminated. The disengagement of the clutch prior to establishment of a gear ratio is accomplished by the gear shift lever during well known manipulations to establish the desired gear ratio and without any added effort by the operator. After a speed [ratio] is established, control of the re-engaging of the clutch is accomplished by manipulation of the accelerator pedal. However, in driving in certain speeds [ratios], as, for example, high speed [ratio] in the particular structure disclosed, the operator may prevent the control by the accelerator of the engaging and disengaging of the clutch after it is caused to be engaged merely by making a supplemental movement of the gear shift lever beyond that necessary to establish the *selected* speed [ratio]. This feature is found to be very useful in motor vehicle driving. Thus, for example, if the operator desires, upon the establishment of high speed [ratio], to take the control of the engaging and disengaging of the clutch away from the accelerator pedal, he may do so by the simple operation of placing the gear shift lever all the way to the supplemental position "S" when high speed [ratio] is first established. When such is done, the clutch will remain disengaged due to vacuum being connected to the rear end of the power cylinder. When the accelerator pedal is depressed, the air trapped in the forward end of the cylinder will then be released and the clutch *caused* [allowed] to engage. It will remain engaged as long as the shifting lever is at the "S" position, regardless of a subsequent release of the accelerator pedal. If the operator should desire to bring the vehicle to a stop and disengage the clutch *4* without causing high speed [ratio] (or some other *selected speed* [ratio]) to become inoperative, he can accomplish this when the accelerator pedal is released merely by moving the gear shift lever from the "S" position back to the "Hi" position. When the accelerator pedal is subsequently depressed, the clutch will re-engage and the vehicle will again move forward. If it is desired that the clutch no longer be under the control of the accelerator pedal, the gear shift lever can be moved back to the "S" position. This return movement to the "S" position can be done either before or after depressing of the accelerator pedal.

Being aware of the possibility of modifications in the particular structure herein *illustrated and* described without departing from the fundamental principles of my invention, I do not intend that its scope be limited except as set forth by the appended claims, *in which* [. In the appended claims] reference is made broadly to certain structure shown and described by way of example in order that equivalent structure to which applicant is entitled will clearly come within the terms of the claims. The term "shifting means," together with the "member," "movable member," "selecting member," "manually controlled member," or like terms, refer to the disclosed hand lever and the connection between it and the gearing or equivalent structure. The term "power means" refers to the disclosed fluid *pressure* motor 63 and is intended to cover all equivalent power means. The "means" for causing operation of the power means including "two control [members] *elements*" refers to the two valve means D and E and the structure for controlling the valve means and is intended to cover equivalent control means, depending on the type of power means employable. In connection with the claims calling for the "control means" controllable by the gear shifting lever 33 or its equivalent, such refers to the valve means D or equivalent means.

Having fully described my invention, what I claim as new and desire to secure by Letters Patent of the United States is:

1. In combination with a [main] *motor vehicle friction* clutch, a change-speed gearing and shifting means therefor including a member having a range of movement when the gearing is in neutral; of power means *operable* for disengaging the clutch; a source of power for the power means; means for causing operation of the power means including two control [members] *elements* each of which is capable of causing the operation of said power means; means for selectively operating the control [members] *elements* by movements of the movable member of the shifting means in opposite directions from an intermediate point in its said neutral range of movement; and means operable independently of the shifting member for disconnecting the source of power [of] *from* the power means, and for controlling the power means at will to [permit] *control* re-engagement of the clutch.

2. In combination with a [main] *motor vehicle friction* clutch, a change-speed gearing and shifting means therefor including a movable member having a range of movement when the gearing is in neutral; of a fluid *pressure* motor *operable* for disengaging the clutch; a source of fluid pressure different from atmosphere; conduit means for placing one end only of the motor in communication with the source; two normally closed valves associated with the conduit means each of which is capable of opening said conduit means; and means for selectively opening said valves by movements of the movable member of the shifting means in opposite directions from an intermediate point in its said neutral range of movement.

3. In combination with a [main] *motor vehicle friction* clutch, a change-speed gearing and shifting means therefor including a movable member having a range of movement when the gearing is in neutral; of a fluid *pressure* motor *operable* for disengaging the clutch; a source of fluid pressure different from atmosphere; conduit means for placing one end only of the motor in communication with the source; two normally closed valves associated with the conduit means each of which is capable of opening said conduit means; means for selectively opening said valves by movements of the movable member of the shifting means in opposite directions from an intermediate point in its said neutral range of movement; and other valve means operable at will independently of the movable shifting member for closing said conduit means.

4. In combination with a [main] *motor vehicle friction* clutch, a change-speed gearing and shifting means therefor including a movable member having a range of movement when the gearing is in neutral; of a fluid *pressure* motor including a chamber and a movable member *operable* for disengaging the clutch; a source of fluid pressure different from atmosphere; conduit means for placing one end of the chamber of the motor in communication with the source; a normally closed valve associated with the conduit means; means for opening said valve by movement of the movable member in its said neutral range of movement; other valve means for said conduit means; means for trapping fluid in the other end of the chamber; single valve means for releasing the trapped fluid and for simultaneously admitting fluid at atmospheric pressure to the said first end of the chamber; and manually-operated common control means for closing said other valve means and opening the said last-named single valve means.

5. In combination with a [main] *motor vehicle friction* clutch, a change-speed gearing and shifting means therefor including a single movable control member; of power means *operable* for disengaging the clutch; control means controlled by the single movable member for operating the power means to disengage the clutch prior to a change speed gear ratio being established; means operable at will independently of the single movable control member for causing the power means to [permit] *control* re-engagement of the clutch and disengagement of the clutch when a gear ratio is established, and means for preventing said last-named means from functioning by movement of the movable member to a position supplemental to that required to establish the gear ratio.

6. In combination with a [main] *motor vehicle friction* clutch, a change-speed gearing and shifting means therefor including a single swingable selecting member having a movement in a plane for establishing a gear ratio and free movement at right angles thereto when the gearing is in neutral condition; of a fluid *pressure* motor *operable* for disengaging the clutch; *a source of pressure fluid different from atmosphere* means comprising a control valve for controlling the fluid motor; and mechanical means directly operable by the selecting member for causing the valve to be open or closed by movements of the selecting member in either the gear ratio establishing plane, or in the plane at right angles thereto.

7. In combination with a motor vehicle engine; an accelerator mechanism therefor; a change-speed gearing; means for changing the speeds [ratios] thereof; and a [main] *friction* clutch between the engine and the gearing; of a fluid *pressure* motor comprising a chamber and a movable member therein and *operably* connected to the clutch; a source of pressure other than atmosphere; conduit means between the source and one end of the chamber; valve means controlled by the [gear] *speed* changing means for opening said conduit means prior to the establishment of a *speed* gear ratio; other valve means for the conduit means; means for causing the other valve means to be open when the accelerator mechanism is released and closed when operated; and means comprising valve means for permitting varied communication of both ends of the fluid motor chamber with the atmosphere when the accelerator mechanism is released.

8. In combination with a motor vehicle engine; a control mechanism therefor; a change-speed gearing; means for changing the speeds [ratios] thereof and a [main] *friction* clutch between the engine and the gearing; of a fluid *pressure* motor having a chamber and a movable member therein connected to operate the clutch; a source of fluid pressure other than atmosphere; conduit means for connecting one end of the chamber of the motor to the source; valve means for controlling said conduit means; means for opening and closing said valve means by the means for changing the gear ratio of the gearing; other valve means for said conduit means; means for trapping fluid in the other end of the chamber; means for simultaneously releasing the trapped fluid and admitting air under atmospheric pressure to the said one end of the fluid motor chamber; and means for controlling said other valve means and said last-named means by the control mechanism for the engine.

9. In combination with a motor vehicle engine; an accelerator mechanism therefor; a [main] *friction* clutch; a change-speed gearing and shifting means therefor including a single movable control member having a range of free movement in one plane when the gearing is in neutral condition; of means for [permitting] *providing* said member [to have] *with a* supplemental movement in another plane beyond that necessary to establish a gear ratio; power means *operably connected* for disengaging the clutch; control means for causing the power means to be operative to disengage the clutch when the accelerator mechanism is released; means for operating said control means when the single member is moved in its neutral range of free movement, and for also operating said control means when moved in the range of movement which is supplemental to that necessary to establish a gear ratio; and means operable when the accelerator mechanism is moved from released position for re-engaging the clutch if disengaged.

10. In combination with a motor vehicle engine; an accelerator mechanism therefor; a [main] *friction* clutch, a change-speed gearing and shifting means therefor including a single movable control member having a range of free movement in one plane, when the gearing is in neutral condition; of means [permitting] *providing* said member [to have] *with a* supplemental movement in another plane beyond that necessary to establish a gear ratio; a fluid *pressure* motor *operably* connected for disengaging the clutch; a source of fluid pressure other than atmosphere; conduit means between the source and the motor; a normally closed valve in said conduit means; means for opening the valve by movement of the single member in the neutral range of movement, and for [permitting] *causing* the valve to close when said single member is given said supplemental movement; a second valve in the conduit means; and means for causing said second valve to open when the accelerator mechanism is released and closed when moved from released position.

11. In combination with a motor vehicle engine; an accelerator mechanism therefor; [main] *friction* clutch; a change-speed gearing and shifting means therefor comprising a single selecting member movable in two parallel planes to control the [speed] *gear* ratios, and between the planes to select the [speed] *gear* ratios when the gearing is in neutral condition; of a *suction-operated* [fluid] motor; a source of suction; conduit means between the source and the motor; means comprising valve means for opening the conduit means when the single selecting member is moved from a predetermined position between the planes to either plane to select a [speed] *gear* ratio; and means comprising other valve means for closing the conduit means when the accelerator mechanism is in other than the released position.

12. In combination with a [main] *motor vehicle friction* clutch, a change-speed gearing and shifting means therefor including a manually controlled member having movement in two parallel planes to establish gear ratios, and a range of movement in a cross plane corresponding to neutral condition of the gearing; of power means *operable* for disengaging the clutch; and control means for causing disengaging of the clutch *by said power means* and being controlled by the movement of said member from an intermediate point in the range of movement in the cross plane toward either of the parallel planes, and prior to becoming positioned in a parallel plane.

13. In combination with a [main] *motor vehicle friction* clutch; a change-speed gearing and shifting means therefor including a manually controlled member having movement in two parallel planes to establish gear ratios, and a range of movement in a cross plane corresponding to neutral condition of the gearing; a fluid *pressure* motor *operably* connected to disengage the clutch; a source of fluid pressure; conduit means between the source and motor; valve means associated with the conduit means; and means for opening the valve means by a manual movement of the said member from an intermediate point in the range of movement in cross plane toward either of the parallel planes, and prior to becoming positioned in a parallel plane.

[14. In combination with a main clutch and a change-speed gearing having a shiftable element for changing the speed ratios, of a manual shifting member, a mechanical connection between the manual shifting member and the element for moving the element to establish a speed ratio, means associated with said mechanical connection for permitting a supplemental movement of the manual member without movement of the element after the speed ratio is established, a fluid motor connected to disengage the clutch, a source of fluid pressure different from atmosphere, conduit means between the source and the motor, a valve associated with the motor, means for opening the valve by a movement of the manual member prior to establishment of the speed ratio and means for closing the valve by the supplemental movement of the manual member after the speed ratio is established.]

15. In control mechanism for [a] *an automotive* change-speed gearing having different gear ratios selectively establishable from a neutral position, and an associated [main] *friction* clutch; a manually controlled member having a movement in two different planes; means for selectively connecting said member to the said gearing so that when said member is in one plane, said gearing will be in neutral, and when said member is moved to a predetermined position in the other plane a gear ratio will be established; a fluid *pressure* motor having a movable element operatively connected to said [main] clutch; a source of fluid pressure different from atmosphere connected by conduit means to one end only of said motor; a valve associated with the conduit means; means for closing said valve when the manually controlled member is in a predetermined position in said neutral plane, and for opening said valve by a movement of said member within the same plane; means for maintaining said valve in its open position during movement of said member in said other plane to establish said gear ratio, and for closing said valve after full establishment of said gear ratio; a second valve interposed in said conduit means, and means independent of the manually controlled member for opening and closing said second valve at will.

16. In control mechanism for [a] *an automotive* change-speed gearing having different gear ratios selectively established from a neutral position, and an associated [main] *friction* clutch; a manually controlled member having a movement in two different planes; means for selectively connecting said member to the said gearing so that when said member is in one plane said gearing will be in neutral, and when said member is moved to a predetermined position in the other plane a gear ratio will be established; a fluid *pressure* motor having a movable element operatively connected to said [main] clutch; a source of fluid pressure different from atmosphere connected by conduit means to one end only of said motor; a valve associated with the conduit means; means comprising direct mechanical connections between said valve and the manually controlled member for closing said valve when the manually controlled member is in a predetermined position in said neutral plane, and for opening said valve by a movement of said member within the same plane; means for maintaining said valve in its open position during movement of said member in said other plane to establish said gear ratio, and for closing said valve after full establishment of said gear ratio; a second valve interposed in said conduit means, and means independent of the manually controlled member for opening and closing said second valve at will.

17. In combination with a [main] *motor vehicle friction* clutch, a change-speed gearing and ratio changing means therefor including a single movable control member; of power means *operable* for disengaging the clutch and [permitting] *controlling* its re-engagement, control means controlled by the single movable member for causing operation of the power means to disengage the clutch prior to a speed ratio being established; means operable at will independently of the single movable member for causing the power means to [permit] *control* re-engagement of the clutch or to cause the power means to disengage the clutch, and means for preventing the last-named means from functioning by the movement of the single movable control member to a supplemental position not previously occupied.

18. In combination with a [main] *motor vehicle power-operated friction* clutch; a change-speed gearing and *gear* ratio changing means therefor including a single movable member having a first position where the gearing is neutral, a second position where a [speed] *gear* ratio is established, and a third position supplemental to the second position and different from the first position; means operable by the single movable member when moved from the first position to the second position for causing the power means to disengage the clutch prior to the establishment of the [speed] *gear* ratio; means operable independently of the single movable member for controlling the power means at will, and causing engagement and disengagement of the clutch when the [speed] *gear* ratio is established and the single movable member is in its second position; and means for preventing the last-named means from functioning when the single movable member is placed in supplemental position.

19. In combination with a *motor* vehicle engine, [its] *an* accelerator mechanism, a [main] *friction* clutch *operable by power means*, a change-speed gearing and *gear* ratio changing means therefor including a shifting lever having a first position where the gearing is neutral, a second position where a [speed] *gear* ratio is established, and a third position supplemental to the second position and different from the first position; means operable by the shifting lever when moved from the first position to the second position for causing the power means to disengage the clutch prior to the establishment of the [speed] *gear* ratio; means operable by manipulation of the accelerator mechanism [of] *or* the shifting lever for controlling the power means at will, and causing engagement and disengagement of the clutch when the [speed] *gear* ratio is established and the shifting lever is in its second position; and means for preventing the last-named means from functioning when the shifting lever is placed in the supplemental position.

20. In combination with a motor vehicle *power-operated* [main] *friction* clutch and a change-speed gearing having *gear* ratio changing means including a shiftable lever; of power means for disengaging the clutch and [permitting] *controlling* its re-engagement; control means controlled by the shiftable lever for causing operation of the power means to disengage the clutch prior to a [speed] *gear* ratio being established; means providing the shifting lever to have a first position where a [speed] *gear* ratio is caused to be established, and a supplemental position where the [speed] *gear* ratio continues to be established; means controllable at will when the shifting lever is in the first position for causing the power means to [permit] *control* re-engagement of the clutch or disengagement thereof; and means operable by the placing of the shifting lever in the supplemental position for preventing the means controllable at will from functioning to control the power means, but not preventing said means from causing at will the re-engagement of the clutch if in disengaged condition.

21. In combination with a motor vehicle engine having an accelerator mechanism, a [main] *friction* clutch and a change-speed gearing having *gear* ratio changing means including a shiftable lever; of power means *operable* for disengaging the clutch and [permitting] *controlling* its re-engagement; control means controlled by the shiftable lever for causing operation of the power means to disengage the clutch prior to a [speed] *gear* ratio being established; means providing the shifting lever to have two positions in both of which the [speed] *same gear* ratio is established; control means for causing the power means to [permit] *control* re-engagement of the clutch or disengagement of the clutch when the accelerator mechanism is in different positions and the shifting lever is in one of its said positions [when] *wherein* a [speed] *gear* ratio is established; and means for preventing the power means from being controlled by the accelerator mechanism when the shifting lever is in its other position [where] *wherein* the said [speed] *gear* ratio [is] *continues* established.

*22. In combination with a motor vehicle friction clutch; a change-speed gearing actuatable to establish a plurality of gear ratios; ratio changing means therefor including a movable*

*selector for establishing a chosen gear ratio upon movement to a selected predetermined position; and a movable control member; the improvements of power means actuatable upon movement of said control member to disengage said clutch and to control its re-engagement while said selector remains in said predetermined position; and means responsive to movement of said selector from said predetermined position for preventing clutch disengagement upon movement of said control member without disturbing said chosen gear ratio.*

*23. In an automotive vehicle having an engine equipped with a throttle valve; an engageable and disengageable friction clutch; a change-speed gearing actuatable to establish different gearing conditions including a plurality of driving conditions and a neutral non-driving condition; and control means including a gearing actuator operable to establish any one of said conditions; and a personally-movable throttle valve actuator: the improvements of power means operatively connected with said clutch; means for energizing said power means; control means operable in response to movement of said throttle valve actuator in effecting energization of said power means to disengage said clutch and to control its re-engagement upon movement of said throttle valve actuator to an extreme position and from said extreme position, respectively; said power means accommodating movement of said gearing actuator to establish any one of said conditions and said power means also disengaging and controlling re-enegagement of said clutch upon movement of said throttle valve actuator even in the absence of movement of said gearing actuator; and a control element operatively interposed between said energizing means and said power means and actuatable on further movement of said gearing actuator after establishment of one of said driving conditions to prevent energization of said power means to disengage said clutch despite movement of said throttle valve actuator following clutch re-engaging movement thereof, said control element being rendered ineffective only on operation of said gearing actuator to establish a gearing condition other than that at which said element is actuated.*

*24. In an automotive vehicle having an engine; an engageable and disengageable friction clutch; a change-speed gearing actuatable to establish different gearing conditions, including a plurality of driving conditions and a neutral non-driving condition; and control means including a gearing actuator shaft movable both axially and rotatably from a central neutral condition for establishing said driving conditions; the improvements of power means for disengaging said clutch and for controlling engagement thereof; opposed control elements spaced axially of said shaft and adapted to condition said power means for controlling actuation of said clutch into and out of engaged condition; and a member movable axially and rotatably with said shaft and interposed between said control elements for acting upon said elements individually as said shaft is moved axially to actuate said elements in accordance with movement of said shaft, said member being rendered inoperative with respect to both of said elements upon rotating movement of said shaft to a predetermined position wherein said clutch is engaged and a driving condition established to prevent actuation of said clutch and interruption of said driving condition so long as said shaft is retained in its said predetermined position.*

*25. In an automotive vehicle having an engine; an engageable and disengageable friction clutch; power means for actuating said clutch to a disengaged condition and for controlling said clutch to an engaged condition; a change-speed gearing actuatable to establish different gearing conditions; and control means including a gearing actuator rod movable both axially and rotatably for establishing said driving conditions; the improvements of a member movable axially and rotatably with said rod; and a control element positioned adjacent said rod and actuatable axially of said rod by contact with said member as the same is moved axially with said rod to condition said clutch power means for actuation, said member being movable upon selective rotation of said rod to a plurality of positions lying in a single plane including two positions at which different driving conditions of said gearing are established and said control element is actuated, and a third position at which one of said different gearing conditions is retained and said control element is released to prevent conditioning of said clutch power means for actuation to interrupt said one of said driving conditions so long as said member is retained in its said third position.*

*26. In combination with a motor vehicle friction clutch; a change-speed gearing actuatable to establish a plurality of gear ratios; ratio changing means therefor including an elongated selector shaft movable by actuation of a selector lever both axially of the shaft and rotatably about the shaft axis for selectively establishing and disestablishing a chosen gear ratio upon movement of the lever and a movable control member; the improvements of power means actuatable upon movement of said control member to disengage said clutch and to control its reengagement while said selector remains in said predetermined position; and means responsive to movement of said lever for conditioning said power means for actuation by said control member, said last-mentioned means including a pair of slidable control elements movable in the plane of the axis of said selector shaft, and means operably connected to said shaft for axial movement therewith to selectively control movement of said control elements upon axial movement of said selector lever.*

*27. In combination with a motor vehicle friction clutch; a change-speed gearing actuatable to establish a plurality of gear ratios; ratio changing means therefor including an elongated selector shaft movable by actuation of a selector lever both axially of the shaft and rotatably about the shaft axis for selectively establishing and disestablishing a chosen gear ratio upon movement of the lever to and from a selected one of a plurality of predetermined positions including a neutral position; and a movable control member; the improvements of power means actuatable upon movement of said control member to disengage said clutch and to control its reengagement while said selector remains in said selected one position; and means responsive to movement of said lever for conditioning said power means for actuation by said control member, including a pair of opposed slidable control elements movable in the plane of the axis of said selector shaft to operative and inoperative positions, a plate carried by said shaft for axial movement therewith and inter-*

*posed between said control elements for selective actuation of said elements to operative positions, and spring means acting on said elements to urge the same toward inoperative position and acting on said plate through said control elements to normally centralize said plate therebetween with the elements in their respective inoperative positions and said control lever in its said neutral position.*

*28. In combination with a motor vehicle friction clutch; a change-speed gearing actuatable to establish a plurality of gear ratios; ratio changing means therefor including an elongated selector shaft movable by actuation of a selector lever both axially of the shaft and rotatably about the shaft axis for selectively establishing and disestablishing a chosen gear ratio upon movement of the lever to and from a selected one of a plurality of predetermined positions including a neutral position; and a movable control member; the improvements of fluid pressure-actuated power means actuatable upon movement of said control member to disengage said clutch and to control its re-engagement while said selector remains in said selected one position; a source of fluid pressure different from atmosphere; and means responsive to movement of said lever for conditioning said power means for actuation by said control member, including a pair of opposed slidable shut-off valves interposed between said power means and said source and having ball-type valve bodies movable in the plane of the axis of said selector shaft to open and closed positions establishing and interrupting communication between said power means and said source, a plate carried by said shaft for axial movement therewith and interposed between said valves for selective actuation of said valves to open positions, and spring means acting on said valves to urge the same toward closed position and acting on said plate through said control elements to normally centralize said plate therebetween with the valves in their respective inoperative positions and said control lever in its said neutral position.*

*29. In an automotive vehicle having an engine; an engageable and disengageable friction clutch; a change-speed gearing actuatable to establish different gearing conditions comprising a plurality of driving conditions and a neutral non-driving condition; control means including a gearing actuator movable to a plurality of adjusted positions for establishing neutral and a given one of said driving conditions and to an additional position for establishing a supplementary driving condition, and an accelerator pedal for said engine; the improvements of a source of power; power means operatively connected to said clutch and including a control element actuatable by said accelerator pedal to control the connection of said power means to said source of power, said power means being operable to effect disengagement of said clutch upon release of said pedal and to control re-engagement of said clutch upon actuation of said pedal; a shut-off element interposed between said source of power and said power means for actuation to a closed position to prevent operation of said power means despite release of said pedal following clutch re-engagement; and a movable element actuatable upon movement of said gearing actuator to its said supplementary position to actuate said shut-off element to its said closed position, thereby preventing disengagement and re-engagement of said clutch in response to accelerator pedal movement after said supplementary condition is established, said pedal being effective to disengage and control re-engagement of said clutch only upon movement of said gearing actuator to establish one of said gearing conditions other than said supplementary condition.*

*30. In combination with a friction clutch provided with a driving member and a driven member adapted to be corotated in abutting relation to transmit torque and to be separated to interrupt torque transmission, a change-speed gearing having a shiftable element for changing the gear ratios thereof, and an accelerator pedal; a manual shifting member, a mechanical connection between the manual shifting member and the element for moving the element to establish a gear ratio, means associated with said mechanical connection for accommodating a supplemental movement of the element after the gear ratio is established, a fluid pressure motor operably connected to said driven clutch member to disengage the clutch by separating the clutch members, a source of fluid pressure different from atmosphere, conduit means between the source and the motor, valve means in said conduit means normally actuatable in response to accelerator pedal movement to control operation of said motor, a closable shut-off valve also in said conduit means, and means for settably closing the valve by the supplemental movement of the manual member after a gear ratio is established thereby to prevent actuation of said motor in response to manipulation of said valve means until said manual member is moved from the position occupied by virtue of its said supplemental movement.*

GLENN T. RANDOL.

REFERENCES CITED

The following references are of record in the file of this patent or the original patent:

UNITED STATES PATENTS

| Number | Name | Date |
|---|---|---|
| 1,010,054 | Irish | Nov. 28, 1911 |
| 1,666,781 | Kaser | Apr. 17, 1928 |
| 1,772,764 | Vigliano | Aug. 12, 1930 |
| 1,805,120 | Von Erhardt | May 12, 1931 |
| 2,049,738 | Hill et al. | Aug. 4, 1936 |
| 2,051,606 | Jacobs | Aug. 18, 1936 |
| 2,073,692 | Griswold | Mar. 16, 1937 |
| 2,087,643 | Gillett | July 20, 1937 |
| 2,095,763 | Price et al. | Oct. 12, 1937 |
| 2,104,061 | Surdy | Jan. 4, 1938 |
| 2,109,443 | Hill et al. | Feb. 22, 1938 |
| 2,153,509 | Rockwell | Apr. 4, 1939 |
| 2,181,743 | Sanford | Nov. 28, 1939 |
| 2,183,481 | Johnson | Dec. 12, 1939 |
| 2,234,463 | Brewer | Mar. 11, 1941 |
| 2,248,431 | Leukhardt | July 8, 1941 |
| 2,341,756 | Avila | Feb. 15, 1944 |